United States Patent [19]

Johnson

[11] 4,230,329
[45] Oct. 28, 1980

[54] MOBILE CART

[75] Inventor: Aldus Johnson, Lafayette, La.

[73] Assignee: William H. Lambert, Lafayette, La.

[21] Appl. No.: 951,960

[22] Filed: Oct. 16, 1978

[51] Int. Cl.$^2$ .................. A47B 31/04; B62B 1/12; B62B 1/14
[52] U.S. Cl. .................. 280/43.17; 144/286 A; 269/17; 280/43.24
[58] Field of Search ............. 280/43.13, 43.17, 43.24, 280/179 R; 269/17, 88, 321 F; 144/286 R, 286 A

[56] References Cited

U.S. PATENT DOCUMENTS

| | | | |
|---|---|---|---|
| 2,672,349 | 3/1954 | Brock | 280/43.17 |
| 3,598,390 | 8/1971 | Armitage | 269/17 |
| 3,635,174 | 1/1972 | Ball et al. | 108/150 |
| 3,669,031 | 6/1972 | Cole | 108/50 |
| 3,677,574 | 7/1972 | Cyr | 280/43.13 |
| 3,782,750 | 1/1974 | Peters | 280/43.17 |
| 4,016,819 | 4/1977 | Cowling | 108/19 |
| 4,050,671 | 9/1977 | Coleman | 269/17 X |
| 4,138,099 | 2/1979 | Englehart | 269/321 F X |

Primary Examiner—Robert R. Song
Assistant Examiner—Michael Mar
Attorney, Agent, or Firm—Guy E. Matthews

[57] ABSTRACT

A Mobile Cart/Workbench having a remotely controlled retractable support wheel assembly and a support frame adapted to support and transport doors and the like carried along with a carpenter's other woodworking tools.

5 Claims, 3 Drawing Figures

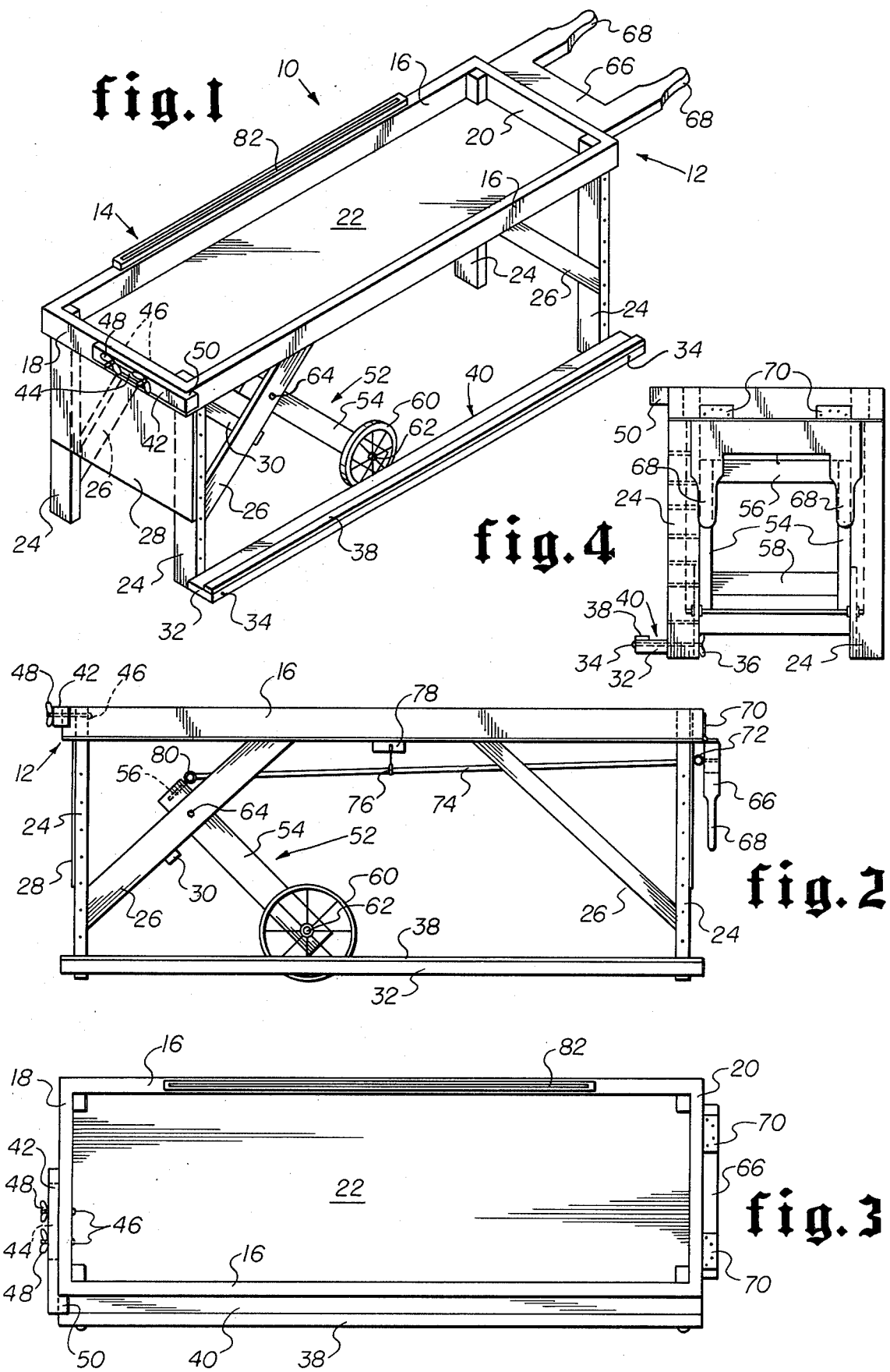

MOBILE CART

BACKGROUND OF THE INVENTION

This invention relates to a portable Mobile Cart used in the carpentry trade for supporting and transporting doors, sheetrock and other wood panels used in building construction and for use as a portable workbench for performing installation operations on such doors, etc.

Brock, U.S. Pat. No. 2,672,349 shows a mobile workbench having vertically movable wheels at one end thereof and operated by a handle at the other end thereof, which workbench may be moved around in a manner similar to a wheelbarrow. However, this device has no means for transporting a door or the like nor does it include a means for retaining a door or the like securely in place for transporting thereof. Consequently, it could not serve as a portable Mobile Cart for transporting doors and the like and various wood working tools therewith.

Other patents considered relevant are Cole, U.S. Pat. No. 3,669,031, disclosing a work table for carrying large, semi-permanent woodworking tools thereon, which table may be rolled about as desired; Armitage, U.S. Pat. No. 3,598,390, disclosing an adjustable work table for preparing wall covering prior to placement on the wall; Good, U.S. Pat. No. 2,993,740, disclosing a portable office machine stand; Cowling, U.S. Pat. No. 4,016,819, disclosing a table having a means whereby the table top may be rotated from a horizontal to a vertical position and rolled about for moving purposes; and Ball, U.S. Pat. No. 3,635,174, disclosing a desk having an included electric wiring receptacle.

In accordance with the invention, Mobile Door Cart is provided, comprising a support frame forming a horizontal supporting surface which serves as a portable workbench for performing various installation operations upon a door or the like, support legs mounted with the support frame, a lower support brace for supporting a door or the like during transporting thereof, an upper retaining bracket for securing the upper portion of the door or the like during transporting thereof, a wheel frame assembly movable between a retracted position in which the support frame rests on its support legs and an extended position in which one end of the support frame rests on the wheel frame assembly, and a handle means for moving the Mobile Cart about, said handle means operably connected to the wheel frame assembly to locate the wheel frame assembly in either of its functional positions.

BRIEF DESCRIPTION OF THE DRAWINGS

Other objects and advantages of the invention will become apparent upon a careful reading of the following detailed description of the invention, the claims and the drawings, in which like reference characters are used throughout to denote like parts in the several views, wherein;

FIG. 1 is a perspective view of the Mobile Door Cart.

FIG. 2 is a side view of the Mobile Door Cart depicted in FIG. 1.

FIG. 3 is a top view of the Mobile Door Cart depicted in FIG. 1.

The following invention will be described in connection with a preferred embodiment; it will be understood that it is not intended to limit the invention to that embodiment. On the contrary, it is intended to cover all alternative modifications and equivalents as may be included in the spirit and scope of the invention as defined by the appended claims.

DETAILED DESCRIPTION OF THE INVENTION

Referring now to the drawings, the Mobile Door Cart, generally illustrated at 10, comprises a support frame 12, including an upper supporting surface 14 and a plurality of support legs 24, lower support brace 32, an upper retaining bracket 42, a wheel frame assembly 52, including support wheels 60 and a handle means 66 for actuating movement of the cart. All major components of the unit, excluding the wheels 60, may be made of wood, as in the preferred embodiment, of light-weight metal, or any combination thereof.

As best shown in FIG. 1, the upper supporting surface 14 comprises side walls 16, a front wall 18, a rear wall 20 and a bottom portion 22. These members are permanently bonded together using wood glue, nails, screws, bolts and nuts or any combination thereof, to form a structurally rigid supporting surface upon which a door or the like may be supported while installation operations are performed thereon.

Permanently mounted to the upper supporting surface 14 are a plurality of support legs 24 for supporting the upper surface upon the floor or the like. Each leg 24 includes a diagonal support brace 26 mounted therewith and to the under surface of the upper supporting surface 14 in a manner to add structural ridigity to the Mobile Door Cart 10. The preferred embodiment includes a transverse front plate 26 mounted on the two front legs 24 to provide additional structural support. Likewise, each set of front and rear diagonal braces 26 has a support cross brace 30 mounted therewith in a manner so as to maintain the diagonal braces, and corresponding legs, in parallel relationship one with the other.

Means are provided for transporting doors, sheets of sheetrock, plywood, etc. with the Mobile Door Cart 10, such means comprising a lower support brace 32 and an upper retaining bracket 42. In the preferred embodiment, the lower support brace 32 comprises a single piece running the longitudinal length of the cart 10 and permanently mounted to the lower end of each leg 24 on either longitudinal side of the cart. This lower brace 32 is mounted to the legs 24 by means of elongated bolts 34 passing through the leg and lower brace and held in place by wing nuts 36 in a manner so as to provide maximum supporting strength in the lower brace 32. Mounted with the lower brace 32 and running the longitudinal length thereof is a lip 38 which forms a retaining groove 40 along the length of the lower brace for retaining the transported doors, sheetrock sheets, plywood sheets, etc.

Means are provided to hold the door, sheetrock, plywood, etc. in position while same is being transported about. In the preferred embodiment an upper retaining bracket 42 is mounted in sliding relation with the front wall 18 of the upper supporting surface 14 by a plurality of machine bolts 46 passing through an elongated slot 44 in the upper bracket 42. Preferably, these bolts 46 are press-fitted through the front wall 18 and extend through the bracket slot 44 to enable the bracket to slide linearly about the bolts 46. Wing nuts 48 are provided to tighten the upper bracket 42 once it is in position. The bracket 42 includes a retaining lip 50 for holding the doors, sheetrock, plywood, etc. in position during transporting thereof.

The Mobile Cart 10 is designed to be used as a portable workbench for performing installation operations on doors and the like, and for transporting such doors about. A wheel frame assembly 52 is provided for mobilizing the door cart. In the preferred embodiment, this assembly 52 comprises a pair of support legs 54, an upper transverse crossbrace 56, a lower transverse crossbrace 58, and a set of support wheels 60 mounted on an axle 62. This wheel assembly 52 is pivotally mounted to the support frame 12 at pivot points 64, so as to permit the wheel assembly to be pivoted or rotated down (clockwise in the drawing) so that the wheels 60 engage the floor and raise the front end (left end in FIG. 3) off the floor. When so raised, the cart 10 may be moved about on the wheels 60 as desired.

A handle means 66 is provided at the end of the cart 10 opposite that of the wheel assembly 52. This handle means 66 is hinged mounted at 70 to the upper surface 14 at the rear wall 20 in such a manner that it may be rotated from a vertical position hanging downwardly adjacent the rear legs 24 to an extended horizontal position, enabling the user to grasp the handle means by included handle grips 68 and move the Mobile Cart about as desired.

The Mobile Cart 10 incorporates a mechanism whereby the wheel assembly 52 is pivoted between its "up" and "down" positions by the handle means 66 operably connected therewith. As shown in the drawings, the preferred embodiment includes a handle means eye bolt 72 connected to a push-pull rod 74. This rod 74 is attached at its opposite end to a similar eye bolt 80 on the wheel assembly 52 in a manner so as to permit the handle means 66 to control the position of the wheel assembly as follows;

(1) As shown in the drawings, with the handle means 66 in its vertically down position, the wheel assembly is pivoted up away from the support frame legs 24 to raise the wheels 60 off the floor;

(2) When the handle is pivoted up (counter-clockwise as shown in the drawings) to the horizontal position, the wheel assembly 52 is simultaneously pivoted down (clockwise as shown in the drawings) to engage the floor and provide rolling support for the cart 10. With the cart 10 in this second position, an operator may grasp the handle grips 68, lift the rear legs 24 off the ground and maneuver the cart about, as one would maneuver a typical wheelbarrow.

(3) When the mobile cart/workbench 10 is located so as to function as a workbench, the operator rotates the handle means 66 downwardly, adjacent the rear legs 24 and out of the way, thus causing the wheel assembly 52 to be pivoted up away from the support frame legs 24, rendering the cart 10 stationary on location. A rod center support eye bolt 76 is provided to prevent the push-pull rod 74 from buckling as the handle means 66 is pivoted from its first horizontal to its second vertical position to raise the wheel assembly 52 off the floor. This eyebolt 76 is mounted with a support block 78 which, in turn, is mounted to the underside of the upper surface bottom portion 22.

An electrical outlet 82 is mounted with either side wall 16 of the support frame, preferably the one opposite the lower brace 32 and retaining bracket 42, and provides convenient access to electrical power used in operating many hand-held electric woodworking tools. Leading from this electrical outlet 82 is a power cord (not shown) for connecting with any available electric power source.

In operation, the Mobile Cart 10 stands on its own support legs 24, as shown in the drawings. The operator, wishing to transport a door, sheet or sheets of sheetrock or plywood, etc., positions same within the retaining groove 40 formed by the lower brace 32 and and lip 38.

Holding the particular item vertical, the operator then slides it toward the front end of the cart 10 (left end as shown in the drawings) and engages the door, etc. against the extended upper retaining bracket 42. He then leans the door, etc. against the support frame side 16 and slides the upper bracket 42 against the door, etc. so that the retaining lip 50 thereof engages the planar surface of the article to be retained and transported. While holding the upper bracket 42 snugly in position, the operator then tightens wing nuts 48 to hold the door, etc. securely in place as the cart 10 is wheeled about.

To mobilize the cart, the operator grasps the handle grips 68 and rotates the handle means 66 up from its suspended vertical position (as shown in the drawing) to its horizontal position extending outwardly from the support frame 12. This movement causes the wheel assembly 52 to rotate downwardly so that the wheels 60 engage the floor and raise the front end of the cart 10 off the ground. The operator then lifts the rear end of the cart 10 by raising the handle means 66, and then moves the cart around on its wheels 60 as desired, as one would move a wheelbarrow about.

When the operator reaches his destination, he lowers the rear legs 24 to the floor and rotates the handle means 66 from its horizontal extended position down to its vertical position, causing the wheel assembly 52 to pivot up away from the support frame legs 24, rendering the cart 10 stationary in order that it be used as a workbench for performing installation operations upon the door, sheetrock or the like being transported therewith.

The operator next loosens the wing nut 48, allowing the upper bracket 42 to slide outboard, releasing the holding force on the transported door, etc. The article may now be removed from the lower brace and positioned upon the workbench support frame 12 for further installation operations.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A portable Mobile Cart for supporting and transporting doors, panels and other planar-shaped articles and woodworking tools used in building construction, and for use as a portable workbench for performing installation operations on such articles, said cart comprising:

(a) A support frame for receiving and supporting a planar-shaped article in horizontal position and for transporting woodworking tools, said frame having
  (1) an upper surface for supporting the article, and
  (2) a plurality of legs for supporting said upper surface,
(b) a first support means mounted with said support frame legs for positioning, transporting and supporting a planar-shaped article parallel to the vertical axis of said cart,
(c) a second support means mounted with said support frame upper surface for retaining a planar-shaped article being carried by said first support means,
(d) a means for mobilizing said cart, and
(e) a handle means for enabling said cart to be moved as desired.

2. A cart as set forth in claim 1, wherein said mobilizing means comprises
  (a) a wheel frame mounted to said support frame, pivotal between a first position in which said wheel frame extends below said support frame to provide a lower mobilizing support for said cart, and a second position in which said wheel frame is pivoted away from below said support frame legs to render said cart stationary while installation operations are performed on a planar-shaped article position thereon, and
  (b) a set of wheels rotatably mounted to said wheel frame to enable said cart to be wheeled around by said handle means as desired when said wheel frame is in its first position.

3. A cart as set forth in claim 2, wherein said handle means is pivotally mounted to said cart and operably connected with said pivotal wheel frame to raise and lower said wheel frame between its first and second positions.

4. A cart as set forth in claim 3, wherein said handle means pivots between a horizontal position extending outwardly from said cart and a vertical position resting adjacent said cart support frame, said cart including a means interconnecting said handle means and wheel frame such that when said handle means is in its horizontal position, said wheel frame is in its first position so that said handle means may be used to move said cart on said wheels as desired, and when said handle means is in its vertical position, said wheel frame is in its second position to render said cart stationary.

5. A cart as set forth in claim 1, wherein said support frame includes an electrical outlet for providing electrical power at said workbench for various woodworking tools.

* * * * *